(12) United States Patent
Wang et al.

(10) Patent No.: US 10,040,120 B2
(45) Date of Patent: Aug. 7, 2018

(54) MANUFACTURING METHOD FOR METALLIC HOUSING OF ELECTRONIC DEVICE

(71) Applicants: Fu Zhun Precision Industry (Shen Zhen) Co., Ltd., Shenzhen (CN); Foxconn Technology Co., Ltd., New Taipei (TW)

(72) Inventors: Cai-Hua Wang, Shenzhen (CN); Yue-Jian Li, Shenzhen (CN); Chen-Shen Lin, New Taipei (TW); Wen-Hsiung Chang, New Taipei (TW); Chun-Jung Chang, New Taipei (TW)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 393 days.

(21) Appl. No.: 15/083,411

(22) Filed: Mar. 29, 2016

(65) Prior Publication Data
US 2016/0207104 A1 Jul. 21, 2016

Related U.S. Application Data

(62) Division of application No. 13/951,672, filed on Jul. 26, 2013, now Pat. No. 9,358,606.

(30) Foreign Application Priority Data

Jul. 19, 2013 (CN) .......................... 2013 1 0304802

(51) Int. Cl.
*B22D 17/24* (2006.01)
*B22D 19/00* (2006.01)
(Continued)

(52) U.S. Cl.
CPC ............. *B22D 25/02* (2013.01); *B22D 17/02* (2013.01); *B22D 17/2218* (2013.01);
(Continued)

(58) Field of Classification Search
CPC ......... B22D 17/24; B22D 19/00; B22D 25/02
See application file for complete search history.

(56) References Cited

U.S. PATENT DOCUMENTS 7,654,305 B2 * 2/2010 Hirao ...................... B22D 17/22
164/113
8,456,809 B2 * 6/2013 Kim .................... H04M 1/0252
361/679.01
(Continued)

FOREIGN PATENT DOCUMENTS

CN 101217577 A 7/2008
CN 101616556 A 12/2009

*Primary Examiner* — Kevin E Yoon
(74) *Attorney, Agent, or Firm* — ScienBiziP, P.C.

(57) ABSTRACT

A manufacturing method for a metallic housing of an electronic device is provided. The method includes providing a die-casting mold, including a male die and a female die engaging with the male die, the male die defining a pouring gate therein, and the female die defining a cavity therein corresponding to the pouring gate; positioning a metallic outer case in the cavity of the female die as an insert; assembling the male die to the female die to cover the cavity, thereby communicating the pouring gate with the cavity; casting pressured molten metal-alloy into the cavity via the pouring gate to form an inner structural member embedded in an inner side of the outer case; dissembling the male die from the female die to expose the cavity, and removing the outer case and the inner structural member from the female die.

10 Claims, 8 Drawing Sheets

(51) Int. Cl.
  *B22D 25/02* (2006.01)
  *B22D 17/22* (2006.01)
  *B22D 17/02* (2006.01)
  *B22D 17/26* (2006.01)
  *H04B 1/3888* (2015.01)

(52) U.S. Cl.
  CPC ............ *B22D 17/24* (2013.01); *B22D 17/26* (2013.01); *B22D 19/00* (2013.01); *H04B 1/3888* (2013.01)

(56) References Cited

U.S. PATENT DOCUMENTS

2003/0019604 A1\* 1/2003 Ishiduka ................ B22D 17/00
  164/98
2013/0136946 A1\* 5/2013 Liu .................... B22D 19/0081
  428/615
2014/0072761 A1\* 3/2014 Kawada ............ B29C 45/14311
  428/138

\* cited by examiner

MANUFACTURING METHOD FOR METALLIC HOUSING OF ELECTRONIC DEVICE

CROSS-REFERENCE TO RELATED APPLICATION

The present application is a divisional application of U.S. patent application Ser. No. 13/951,672, filed on Jul. 26, 2013, which claims priority to Chinese Application No. 201310304802.7 filed on Jul. 19, 2013, the contents of which are entirely incorporated by reference herein.

FIELD

The present disclosure relates to a housing of an electronic device and a manufacturing method thereof, and more particularly to a metallic housing of an electronic device and a manufacturing method thereof.

BACKGROUND

Magnesium alloy, aluminum alloy, or zinc alloy are often used to make housings of electronic devices, due to their light weight, high scalability, easy molding, and high structural strength. Because metal-alloys do not possess the attractive metallic appearance of pure metals, a metallic layer is coated onto an outer surface of the housing to enhance the metallic appearance.

BRIEF DESCRIPTION OF THE DRAWINGS

Implementations of the present technology will now be described, by way of example only, with reference to the attached figures.

DETAILED DESCRIPTION

Figure 1:
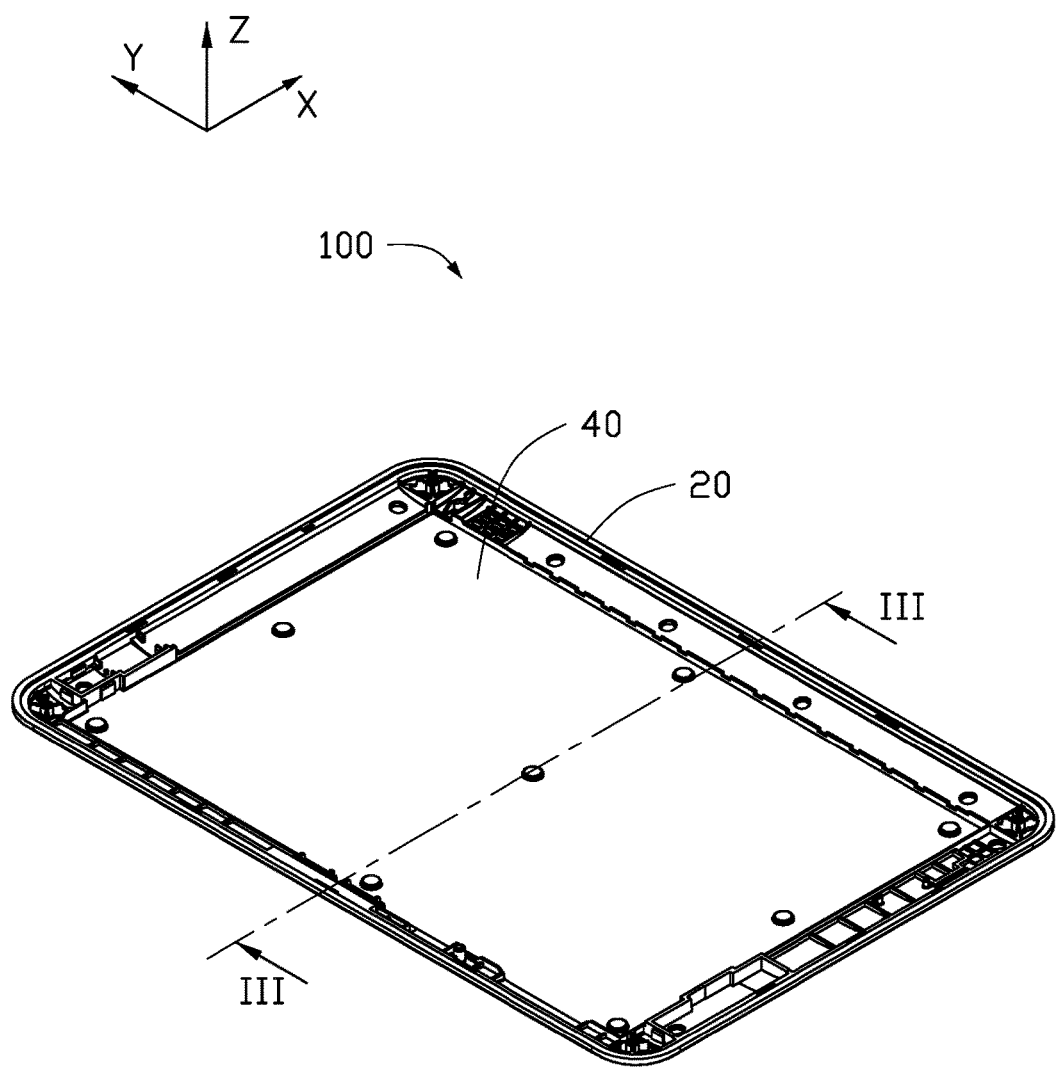
FIG. 1 is an isometric view of an embodiment of a metallic housing of an electronic device.

Referring to FIG. 1, an embodiment of a metallic housing 100 adopted in an electronic device (not shown) includes an outer case 20 and an inner structural member 40. The inner structural member 40 is formed within the outer case 20. The metallic housing 100 may be a housing of a tablet or a mobile phone, for example.

Figure 2:
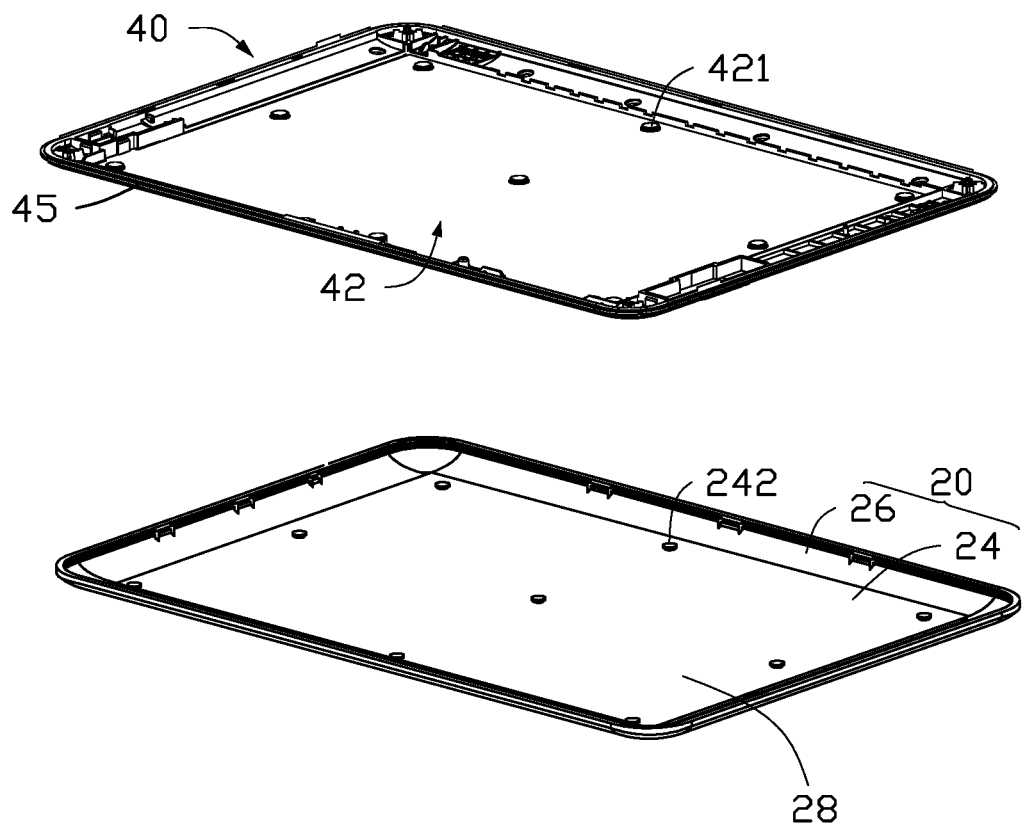
FIG. 2 is an exploded, isometric view of the metallic housing of FIG. 1.
Figure 3:
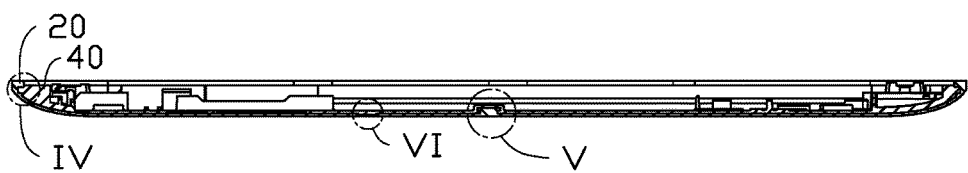
FIG. 3 is a cross-sectional view of the metallic housing of FIG. 1, taken along line III-III.
Figure 4:
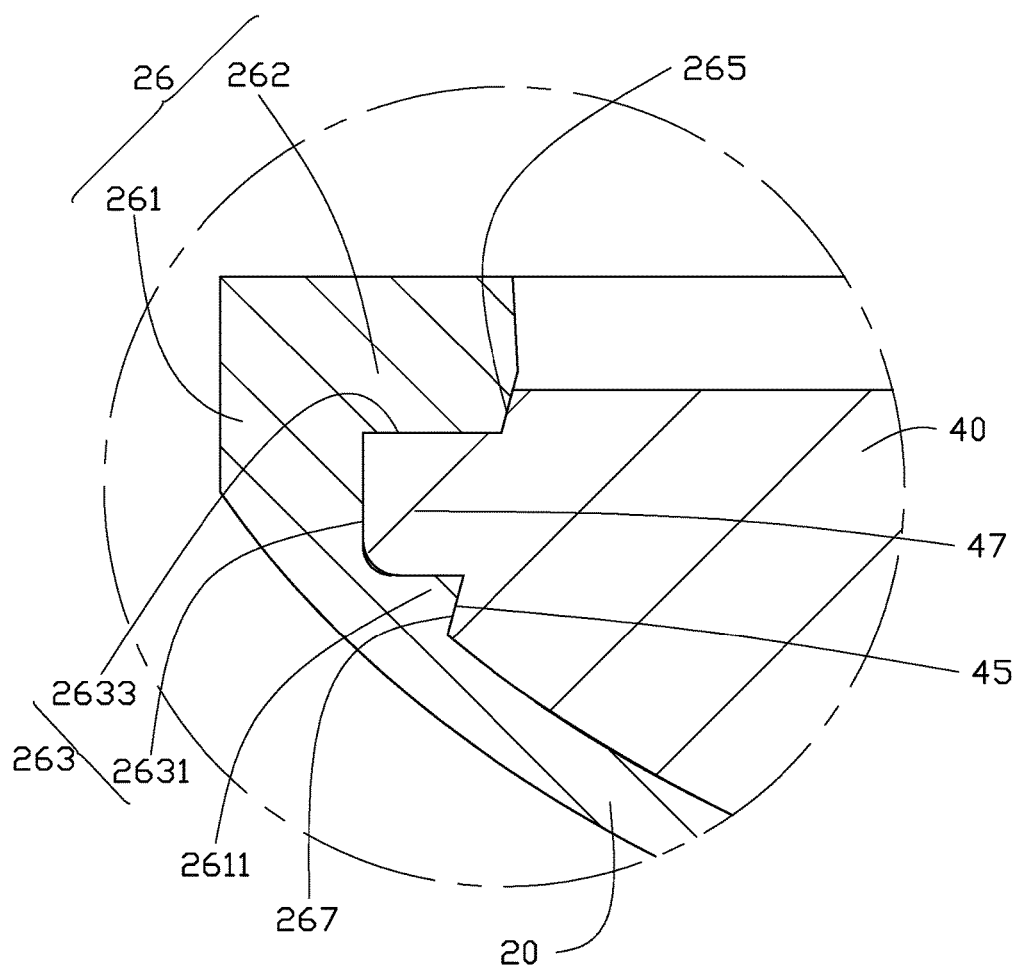
FIG. 4 is an enlarged, cross-sectional view of circled portion IV of the metallic housing of FIG. 3.

Also referring to FIGS. 2 through 4, the outer case 20 is substantially rectangular, and includes a bottom plate 24 and a peripheral sidewall 26 extending from a periphery of the bottom plate 24. The peripheral sidewall 26 surrounds the bottom plate 24. The peripheral sidewall 26 and the bottom plate 24 cooperatively define a receiving chamber 28. The peripheral sidewall 26 includes an adjoining portion 261 at a peripheral edge thereof, and an extending portion 262 extending from the adjoining portion 261 toward an inner side of the outer case 20. The adjoining portion 261 includes a blocking rib 2611 toward the inner side of the outer case 20. The blocking rib 2611 extends along a periphery of the outer case 20, and a cross-sectional view of the blocking rib 2611 is an acute triangle. The peripheral sidewall 26 defines a receiving groove 263 between the extending portion 261 and the blocking rib 2611. The receiving groove 263 extends along the periphery of the outer case 20 and opens toward the inner side of the outer case 20. The receiving groove 263 includes a bottom surface 2631 and two side surfaces 2633 extending substantially perpendicularly from opposite edges of the bottom surface 2631. The bottom surface 2631 is substantially perpendicular to the bottom plate 24. The two side surfaces 2633 are substantially parallel to the bottom plate 24. The extending portion 262 and the blocking rib 2611 respectively form a first blocking surface 265 and a second blocking surface 267 on opposite sides of the receiving groove 263. The first blocking surface 265 and the second blocking surface 267 are substantially coplanar. The first blocking surface 265 forms an obtuse angle with one side surface 2633. The second blocking surface 267 forms an acute angle with the other side surface 2633.

Figure 5:
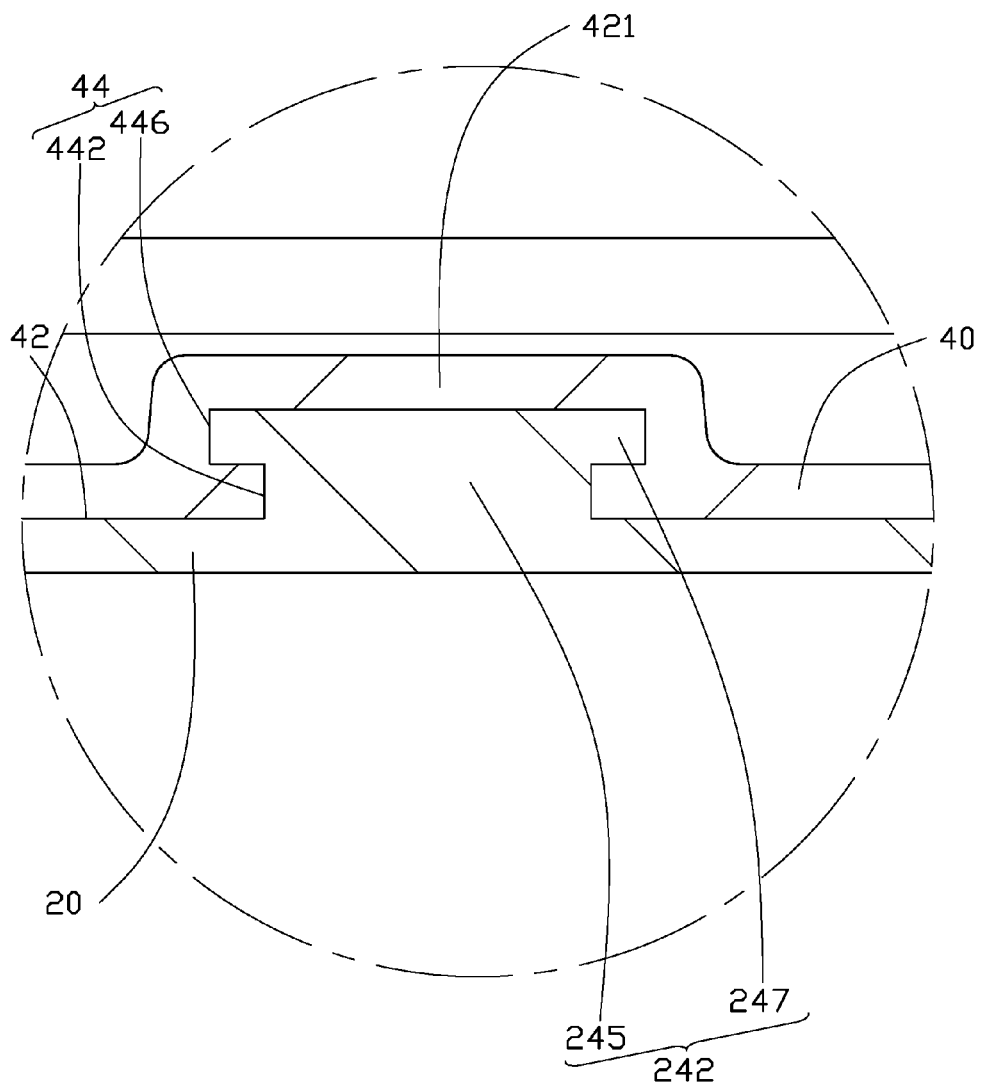
FIG. 5 is an enlarged, cross-sectional view of circled portion V of the metallic housing of FIG. 3.
Figure 6:
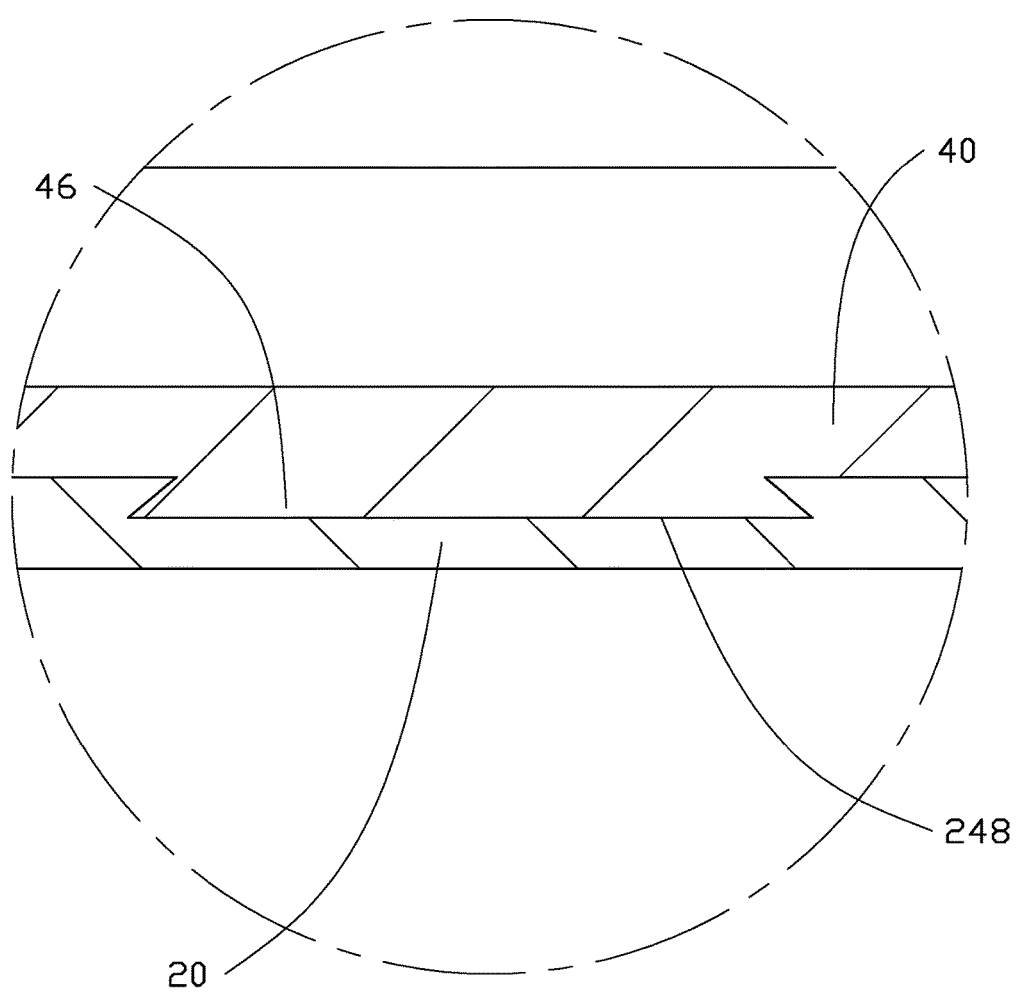
FIG. 6 is an enlarged, cross-sectional view of circled portion VI of the metallic housing of FIG. 3.

Also referring to FIGS. 5 and 6, the bottom plate 24 is equipped with a plurality of latching hooks 242 and defines a plurality of receiving grooves 248. The latching hooks 242 are spaced from each other and protrude from an inner side of the bottom plate 24. The latching hook 242 is substantially cylindrical, and a cross-sectional view of the latching hook 242 is T-shaped. The latching hook 242 includes a connecting portion 245 and a latching portion 247 protruding from the connecting portion 245. The connecting portion 245 is substantially cylindrical and protrudes substantially perpendicularly from the bottom plate 24. The latching portion 247 is substantially disk-shaped and is located on a distal end of the connection portion 245 away from the bottom plate 24. A diameter of the latching portion 247 is greater than that of the connecting portion 245. The plurality of receiving grooves 248 are respectively distributed adjacent to the plurality of latching hooks 242. A cross-sectional view of the receiving groove 248 is a frusto-triangle. The outer case 20 is made of stainless steel, aluminum, or titanium by forging or die-casting. In the illustrated embodiment, the outer case 20 is made of stainless steel by die-casting. A number of the latching hooks 242 is nine. The number of the latching hooks 242 may be adjusted according to design requirements.

In the illustrated embodiment, the inner structural member 40 is a plate shaped and received in the receiving chamber 28 of the outer case 20. The inner structural member 40 includes a base plate 42 and a frame sidewall 45 surrounding a periphery of the base plate 42. Referring to FIG. 4 again, the inner structural member 40 further includes a protruding flange 47 protruding from the frame sidewall 45. The protruding flange 47 extends along an extending direction of the frame sidewall 45. The protruding flange 47 is received in the receiving groove 263. The portions of the frame sidewall 45 adjacent to opposite sides of the protruding flange 47 abut the first blocking surface 265 and the second blocking surface 267 to hold the inner structural member 40 in the outer case 20.

Referring to FIG. 5 again, the inner structural member 40 is equipped with a plurality of combining portions 421, and defines a plurality of combining grooves 44 on the combining portions 421. The combining portions 421 protrude from an inner side of the base plate 42 and are spaced from each other. The plurality of combining grooves 44 are defined on an outer surface of the base plate 42, and receives the plurality of latching hooks 242 respectively to hold the inner structural member 40. Each combining groove 44 corresponds to a combining portion 421, and includes a linking portion 442 and a resisting portion 446 communicating with the linking portions 442. The linking portion 442 is recessed substantially perpendicularly from the base plate 42, and the resisting portion 446 is depressed into the combining portion 421. A diameter of the resisting portion 446 is greater than that of the linking portion 442. The linking portion 442 receives the connection portion 245, and the resisting portion 446 receives the latching portion 247. The latching portions 247 resist a periphery of the resisting portion 446.

Referring to FIG. 6 again, the base plate 42 is further equipped with a plurality of protrusion blocks 46 adjacent to the plurality of combining grooves 44, respectively. A cross-sectional view of the protrusion block 46 is substantially a frusto-triangle. The plurality of protrusion blocks 46 are respectively received in the plurality of receiving grooves 248 of the outer case 20 to hold the inner structural member 40. The inner structural member 40 is made of magnesium alloy, aluminum alloy, or zinc alloy by forging or die-casting. In the embodiment, the inner structural member 40 is made of aluminum alloy by die-casting. Because the inner structural member 40 is formed in the inner side of the outer case 20 by die-casting, a manufacturing procedure is simplified and a cost is reduced. Because the outer case 20 is made of metals such as stainless steel, aluminum, and titanium, a metallic appearance is achieved, thereby omitting a need for a coating process.

Figure 7:
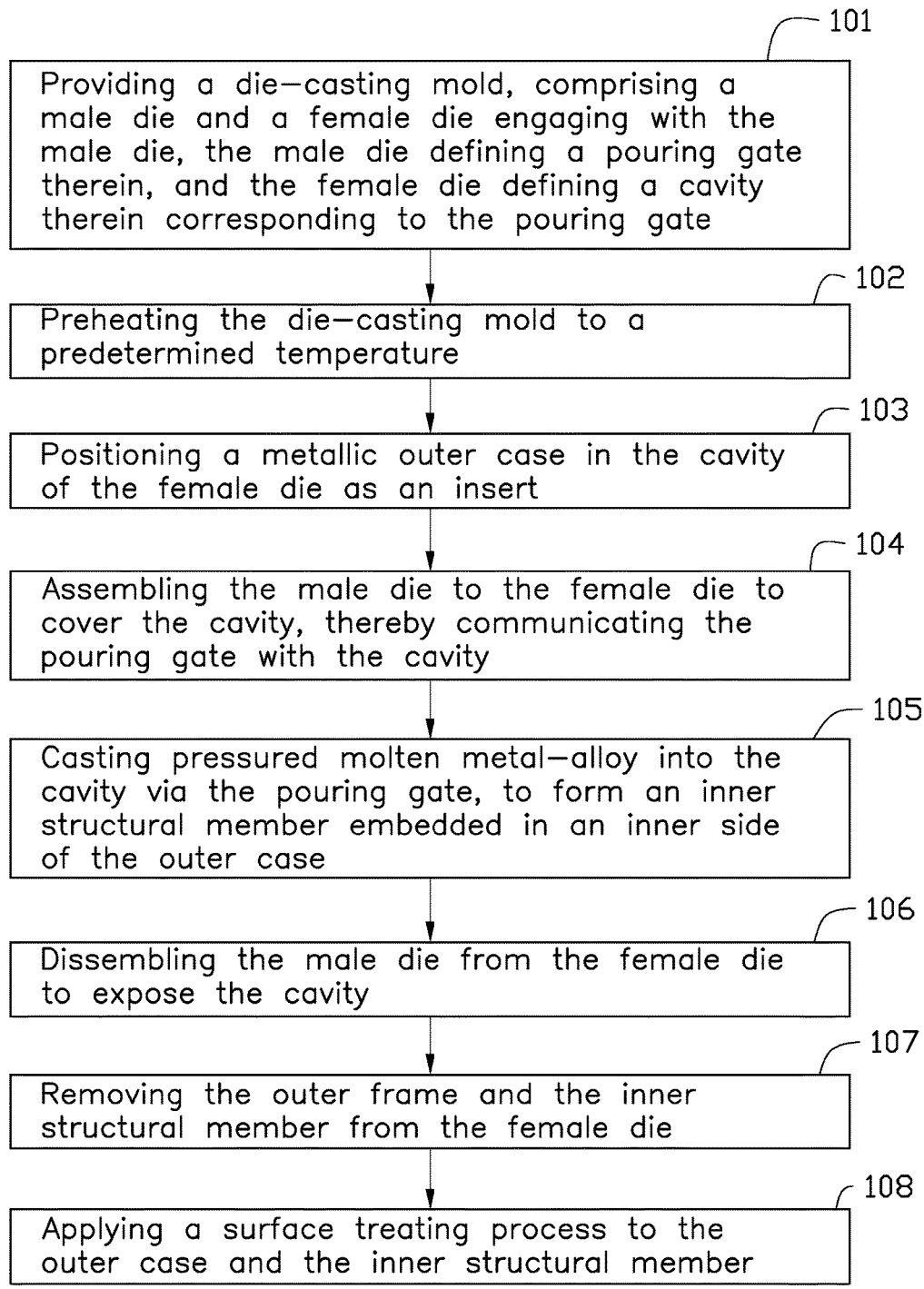
FIG. 7 is a flow chart of an embodiment of a manufacturing method for the metallic housing of FIG. 1.
Figure 8:
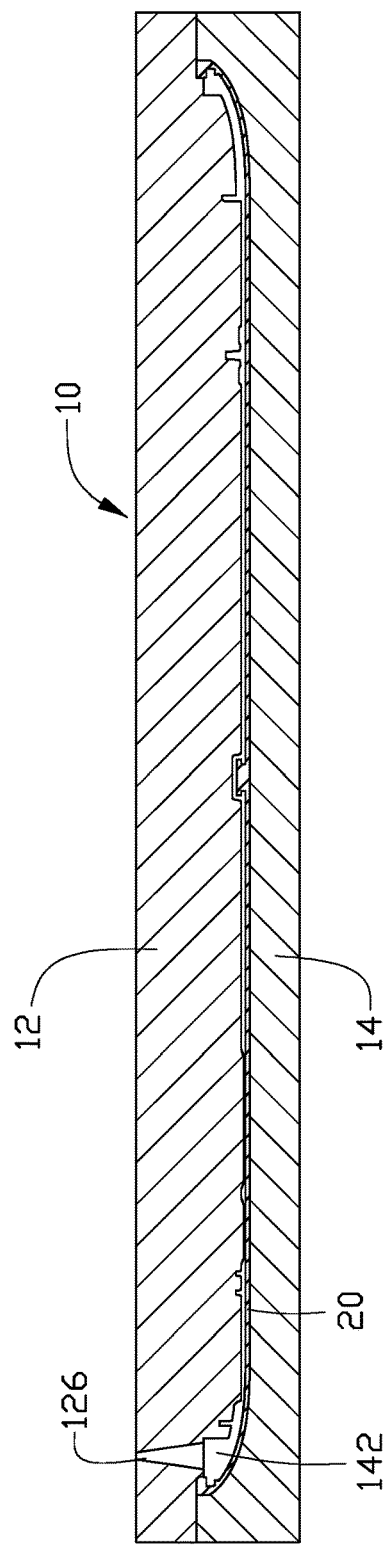
FIG. 8 is a cross-sectional view of a die-casting mold employed in the manufacturing method of the metallic housing of FIG. 1.

Referring to FIGS. 7 and 8, an embodiment of a manufacturing method of the metallic housing 100 is illustrated.

In step 101, a die-casting mold 10 is provided. The die-casting mold 10 includes a male die 12 and a female die 14 engaging with the male die 12. The male die 12 defines a pouring gate 126, and the female die 14 defines a cavity 142 corresponding to the pouring gate 126.

In step 102, the die-casting mold 10 is preheated to a predetermined temperature. If the temperature of the die-casting mold 10 satisfies a requirement of the die-casting process, step 102 may be omitted.

In step 103, a metallic outer case 20 is positioned in the cavity 142 of the female die 14 as an insert. The outer case 20 includes a bottom plate 24 and a peripheral sidewall 26 extending from a periphery of the bottom plate 24 toward a side thereof. The outer case 20 further defines a receiving groove 263 at an inner side along the peripheral sidewall 26. The bottom plate 24 is equipped with a plurality of latching hooks 242 spaced from each other.

The outer case 20 may be made by die-casting, extruding, forging, or punching. In at least one embodiment, the outer case 20 is made by die-casting. The plurality of latching hooks 24 and the receiving groove 263 may be made by a computer numerical control (CNC) process, or be formed by a die-casting process. In at least one embodiment, the plurality of latching hooks 24 and the receiving groove 263 are formed by a die-casting process.

In step 104, the male die 12 is assembled to the female die 14 to cover the cavity 142, thereby communicating the pouring gate 126 with the cavity 142.

In step 105, pressured molten metal-alloy is casted into the cavity 142 via the pouring gate 126 to form an inner structural member 40 embedded in an inner side of the outer case 20. The inner structural member 40 includes a base plate 42, a frame sidewall 45 surrounding a periphery of the base plate 42, a protruding flange 47 protruding from the frame sidewall 45, and a plurality of combining grooves 44 on the base plate 42. The molten metal-alloy is combined with the outer case 20 and is cooled to form the inner structure 40, thereby forming the protruding flange 47 in the receiving groove 263, and defining the plurality of combining grooves 44 respectively receiving the plurality of latching hooks 242. The molten metal-alloy can be molten magnesium alloy, aluminum alloy, or zinc alloy.

In step 106, the male die 12 is disassembled from the female die 14 to expose the cavity 142.

In step 107, the outer case 20 and the inner structural member 40 are removed from the female die 14.

In step 108, the outer case 20 and the inner structural member 40 undergo a surface treating process. Burrs and other defects on the inner structural member 40 resulted from the molding process are removed by the surface treating process. If an appearance of the inner structural member 40 is qualified enough, step 108 may be omitted.

A surface treating process such as polishing step may be added between step 102 and step 103 to remove burrs from the outer case 20 to achieve a more attractive metallic appearance.

The outer case 20 can be made of stainless steel, aluminum, titanium and so on, thereby achieving a required metallic appearance of the metallic housing 100. When changing the materials of the outer case, different metallic appearances are obtained, thereby omitting a need for a coating process. Additionally, because the inner structural member 40 is made of a metal-alloy material, a weight of the metallic housing 100 is reduced.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A manufacturing method for a metallic housing of an electronic device comprising:
   providing a die-casting mold comprising a male die and a female die engaging with the male die, the male die defining a pouring gate therein, and the female die defining a cavity therein corresponding to the pouring gate;
   positioning a metallic outer case in the cavity of the female die as an insert, the metallic outer case comprising a bottom plate, a peripheral sidewall extending from a periphery of the bottom plate toward a side thereof, and a plurality of latching hooks spaced from each other at an inner side of the bottom plate, the peripheral sidewall defining a receiving groove at an inner side along the peripheral sidewall;
   assembling the male die to the female die to cover the cavity, thereby communicating the pouring gate with the cavity;
   casting pressured molten metal-alloy into the cavity via the pouring gate to form an inner structural member embedded in an inner side of the outer case, the inner structural member comprising a protruding flange embedded in the receiving groove, and a plurality of combining grooves respective receiving the plurality of latching hooks;
   dissembling the male die from the female die to expose the cavity; and
   removing the outer case and the inner structural member from the female die wherein the peripheral sidewall comprises an adjoining portion at a peripheral edge thereof, and an extending portion extending from the adjoining portion toward the inner side of the outer case; the adjoining portion comprises a blocking rib toward the inner side of the outer case; the blocking rib extends along a periphery of the outer case, and a cross-sectional view of the blocking rib is an acute triangle; the receiving groove is defined on the adjoining portion between the extending portion and the blocking rib.

2. The manufacturing method of claim 1, further comprising preheating the die-casting mold to a predetermined temperature after positioning the metallic outer case in the cavity of the female die as the insert and before assembling the male die to the female die.

3. The manufacturing method of claim 1, further comprising applying a surface treating process to the outer case and the inner structural member after removing the outer case and the internal structural member from the female die.

4. The manufacturing method of claim 1, wherein the outer case is made of stainless steel, aluminum, or titanium, and the inner structural member is made of magnesium alloy, aluminum alloy, or zinc alloy.

5. The manufacturing method of claim 1, wherein the inner structural member is made of metal-alloy and embedded in the inner side of the outer case, the inner structural member further comprises a base plate and a frame sidewall surrounding a periphery of the base plate, the protruding flange protrudes from the frame sidewall outwardly, and the plurality of combining grooves is defined on the base plate.

6. The manufacturing method of claim 5, wherein the bottom plate defines a plurality of receiving grooves respectively adjacent to the plurality of latching hooks, the base plate comprises a plurality of protrusion blocks adjacent to the plurality of combining grooves respectively, and the plurality of protrusion blocks is embedded in the plurality of receiving grooves respectively.

7. The manufacturing method of claim 6, wherein each latching hook comprises a connecting portion and a latching portion on the connecting portion; the connecting portion protrudes substantially perpendicularly from the bottom plate, the latching portion is located on a distal end of the connection portion away from the bottom plate; the inner structural member further comprises a plurality of combining portions protruding from an inner side of the base plate; the plurality of combining grooves are defined on an outer surface of the base plate; each combining groove comprises a linking portion and a resisting portion communicating with the linking portions; the linking portion is recessed from the base plate substantially perpendicularly and the resisting portion is depressed into the combining portion; the linking portion receives the connection portion, and the resisting portion receives the latching portion.

8. The manufacturing method of claim 7, wherein a diameter of the latching portion is greater than that of the connection portion, a diameter of the resisting portion is greater than that of the linking portion, and the latching portions resists a periphery of the resisting portion.

9. The manufacturing method of claim 1, wherein the receiving groove extends along the periphery of the outer case, and comprises a bottom surface and two side surfaces extending from opposite edges of the bottom surface; the protruding flange is combined to the bottom surface and the two side surfaces of the receiving groove.

10. The manufacturing method of claim 9, wherein the extending portion and the blocking rib respectively define a first blocking surface and a second blocking surface on opposite sides of the receiving groove; the first blocking surface and the second blocking surface are substantially coplanar and inclined toward the bottom surface; the first blocking surface intersects with one side surface and forms an obtuse angle, and the second blocking surface intersects with the other side surface and forms an acute angle; the frame sidewall are combined to the first blocking surface and the second blocking surface to hold the inner structural member.

* * * * *